United States Patent [19]
Weiner et al.

[11] Patent Number: 5,263,891
[45] Date of Patent: Nov. 23, 1993

[54] TURKEY PROCESSING-HOT DEBONING

[75] Inventors: Philip D. Weiner, Grand Rapids, Mich.; Bruce Frankland, Cordova, Tenn.; Thomas Matejovitz, Allendale, Mich.

[73] Assignee: Sara Lee Corporation, Chicago, Ill.

[21] Appl. No.: 969,091

[22] Filed: Nov. 2, 1992

[51] Int. Cl.⁵ .............................................. A22C 21/00
[52] U.S. Cl. .................................. 452/135; 452/149; 452/155; 452/160
[58] Field of Search ............... 452/149, 135, 150, 152, 452/155, 160, 167

[56] References Cited

U.S. PATENT DOCUMENTS

| | | | |
|---|---|---|---|
| 4,439,892 | 4/1984 | Altenpohl | 452/155 |
| 4,558,489 | 12/1985 | Van Mil | 452/160 |
| 4,815,168 | 3/1989 | Van Den Nieuwecarr et al. | 452/149 |
| 5,015,213 | 5/1991 | Hazenbroek | 452/149 |
| 5,035,673 | 7/1991 | Hazenbroek | 452/149 |

Primary Examiner—Willis Little

[57] ABSTRACT

The present invention comprises a method of separating a turkey carcass into a white meat portion and a dark meat hind saddle portion and processing the dark meat prior to rigor mortis. A live turkey is slaughtered, defeathered, eviscerated, and halved into the breast and hind saddle portions. The warm dark meat hind saddle portion is immediately conveyed to a deboning room where the warm dark meat muscle portion is removed, reduced in size and chilled within a short period of time.

9 Claims, 3 Drawing Sheets

TURKEY PROCESSING-HOT DEBONING

BACKGROUND, BRIEF SUMMARY AND OBJECT OF THE INVENTION

This invention relates to the processing of poultry, particularly turkey, and more particularly to pre-rigor processing of the dark meat hind saddle portion. Specifically, it relates to a method of splitting the carcass immediately after slaughter and without chilling into a breast portion (white meat) and a hind saddle portion (dark meat), hot deboning of the hind saddle portion in a quick and efficient manner and subsequent processing of the dark meat. Such process completely eliminates all water immersion chilling and moisture absorption and retention limits testing for the dark meat saddle portion.

Present turkey processing methods include the steps of placing the birds on shackles and moving them along a processing path where they are killed, defeathered, eviscerated, washed and directed through water chillers to lower the temperature before being further processed. The whole turkey carcasses pass through pre-chillers and carcass chillers to reduce the body heat of the carcasses to 40 degrees Fahrenheit or lower. The whole carcasses exit the chillers in a cut-up room where they are separated into parts. Some of the parts go directly to deboning and further processing. The time required to obtain deboned dark meat may be six hours or more. Once rigor mortis sets in the boning process is more difficult and may result in less yield. Also, boning in a rigor phase can result in muscle toughening when the produce is frozen and subsequently cooked.

In the present invention, after the final carcass wash in the eviscerating room, the warm carcass is split into a breast portion (white meat) and a hind saddle portion (dark meat). The break portion normally consists of at least one drummette and both halves of the breast, and the hind saddle portion normally consists of at least one drumstick, the back frame and the thighs. Testing has shown that excellent results are obtained when the hind saddle is hot deboned, pre-rigor, and the boned dark meat properly handled, chilled for preserving prior to further processing.

All dark meat deboned raw materials intended for use in an uncured product is chilled to 40 degrees Fahrenheit or below within two hours from the time of slaughter. All other dark meat deboned raw materials will be cured and chilled to 40 degrees Fahrenheit or below within three hours from the time of slaughter for subsequent use in cooked products.

Water chilling of the carcasses has many disadvantages. It prolongs the processing steps, makes deboning more difficult and results in increased processing costs. The provision of the hot boning procedure of the present invention eliminates the need to water chill. The bacterial count of the boneless dark meat is also reduced which improves shelf life of the product. Hot boning of the hind saddle improves muscle texture, color, flavor and other quality attributes of the subsequent products. It also reduces storage time and space, compared with conventional methods.

One of the primary objects of the invention is the provision of a new and improved method for economically processing poultry by reducing processing time and space requirements.

Another object of the invention is an improved pre-rigor hot deboning process for poultry dark meat which results in improved product texture, color and flavor.

Still another object of the invention is an improved method for processing poultry which improves shelf life of the product by reducing the bacterial count of the boneless meat.

Another object of the invention is an improved processing method which results in a product having better cooking yield, fluffier texture after cooking, and better bite on eating.

A further object of the invention is an improved method for processing poultry which completely eliminates all water chilling of the hind saddle and all moisture absorption and retention limits testing.

Other objects and advantages of the invention will be apparent from the detailed description and claims when considered in conjunction with the accompanying drawings.

DETAILED DESCRIPTION OF THE INVENTION

The turkey is initially prepared by first slaughtering the bird, removing the vicera, feathers, head and feet. The carcass is suspended from and continuously transported on a shackle line as is well known in the art.

Figure 1:
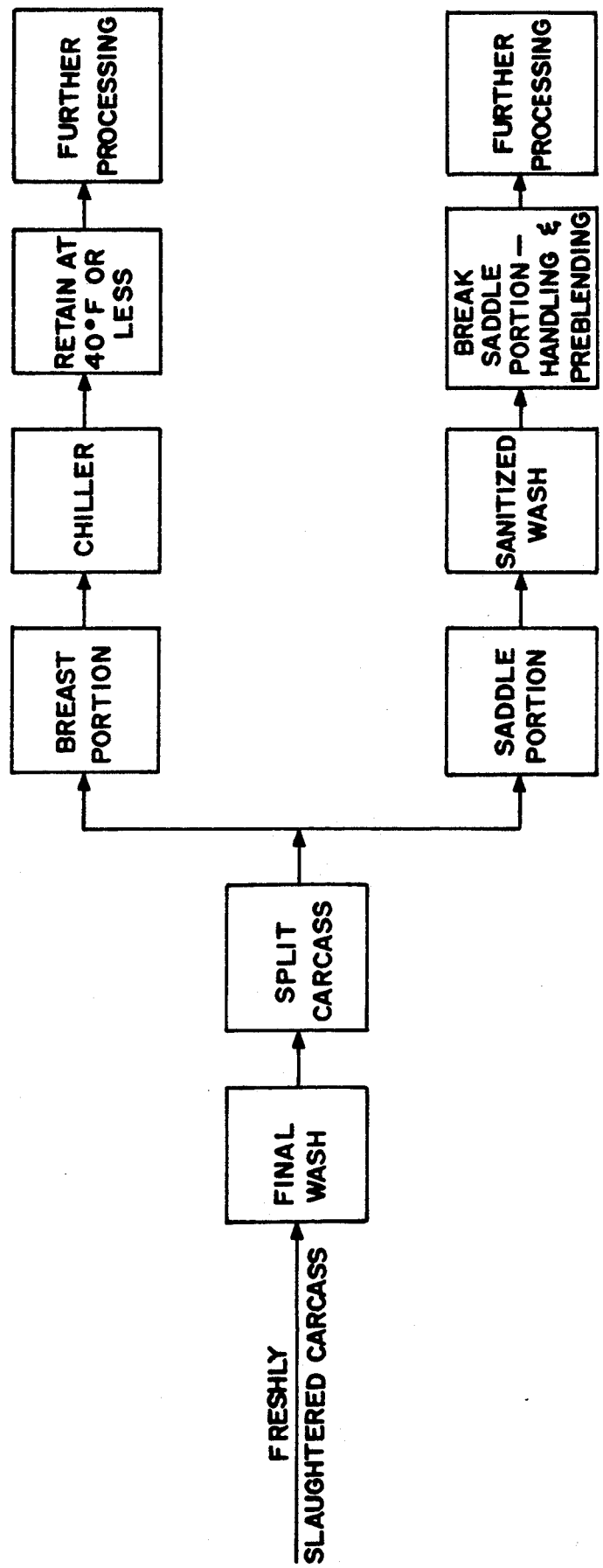
FIG. 1 is a block flow diagram illustrating the basic method of the present invention.

As shown by FIG. 1, after the freshly slaughtered carcass has been inspected, and receives the final wash in the eviscerating room, the carcass is halved or split into a breast portion (white meat) and a hind saddle portion (dark meat).

In the application, the term "breast portion" refers to the drummettes and both halves of the breast, while the term "hind saddle" refers to the thighs, back frame and at least one drum.

After the carcass is split or halved, the breast portion may be transported through chillers and then further processed, as desired.

Upon splitting of the carcass, the warm hind saddle portion (dark meat) will travel directly from the halving operation to a dark meat deboning room where the muscle parts are removed. The dark meat deboning operation is performed in a room refrigerated to 50 degrees Fahrenheit or below. It has been determined that the lowest bacteria counts are obtained when the refrigerated room is operated by maintaining a dry environment without periodic washdown. After deboning, the warm dark meat raw materials intended for use in any uncured product is chilled to 40 degrees Fahrenheit or below within two hours from the time of slaughter. All other warm deboned dark meat raw materials are cured and chilled to 40 degrees Fahrenheit or below within three hours from the time of slaughter for subsequent use in cooked products. The boned dark meat may be chilled through the proper application of ice and/or carbon dioxide.

If desired, the saddle portions may be directed through a sanitized wash prior to entering the dark meat deboning room.

In the deboning room, handling and preblending of the hind saddle dark meat is accomplished in various steps depending on whether the preblends are cured or uncured.

Figure 2:
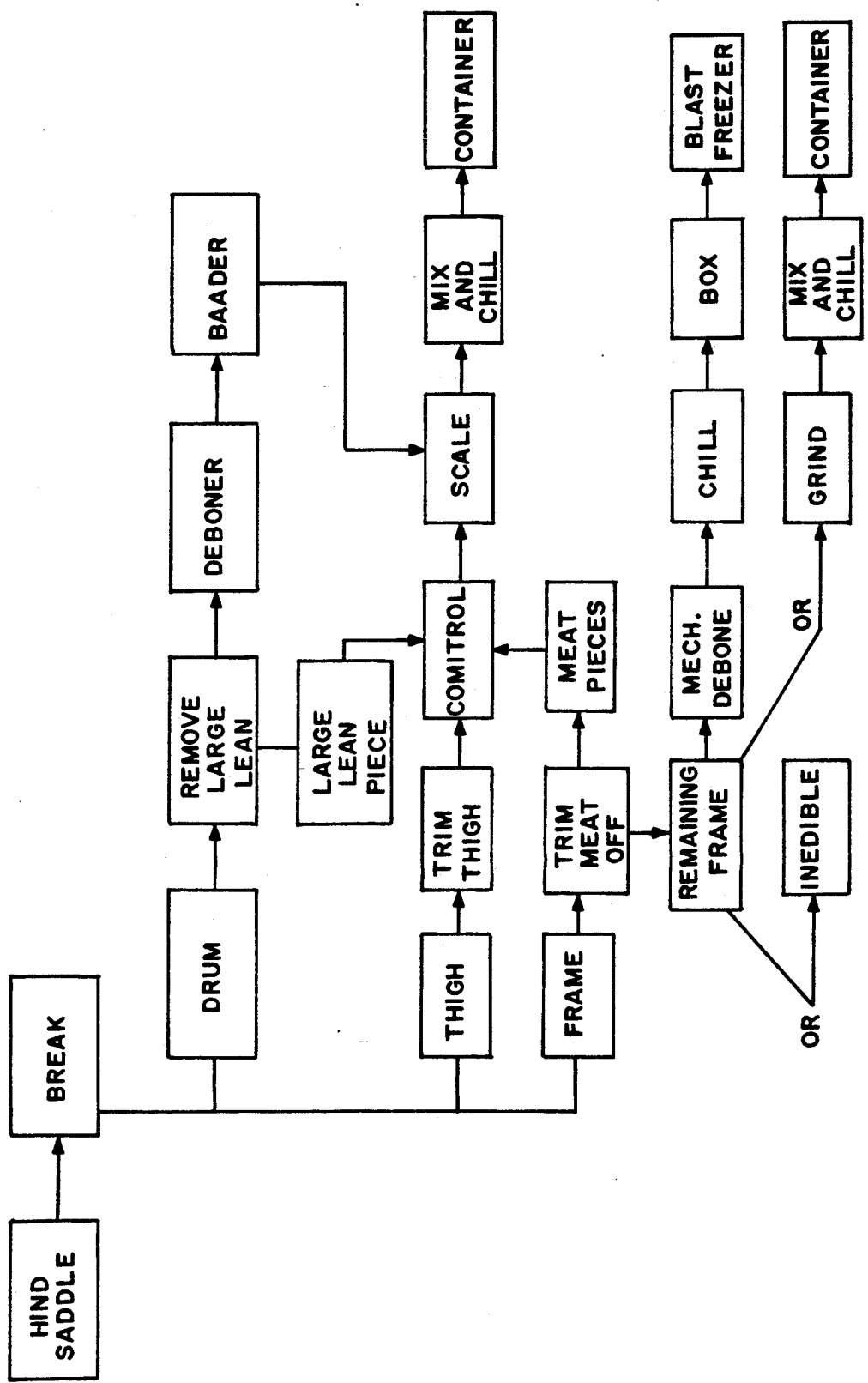
FIG. 2 is a block flow diagram for the dark meat uncured preblends after removal of the hind saddle from the breast portion.

For the uncured preblends, FIG. 2, the hind saddle is separated into drum, thigh and back frame sections. The large lean pieces of the drums are removed with a knife and such muscle pieces are comminutated for size reduction. The remaining portions of the drums are conveyed to a machine where the bones are removed and the remaining portions then are directed to a machine which separates the meat from the tendons. The trimmed thigh and back frame meat also is comminutated. All such meat products are combined, weighed, and appropriate salt and spices are added prior to mixing and chilling.

The remaining frame edible portions, if any, may be mechanically deboned, chilled, boxed and frozen, or they may be directed to a grinder before being chilled and placed in a container. Alternatively, if little or no desirable meat remains on the back frames, such inedible frames may be directed to a separate container.

Figure 3:
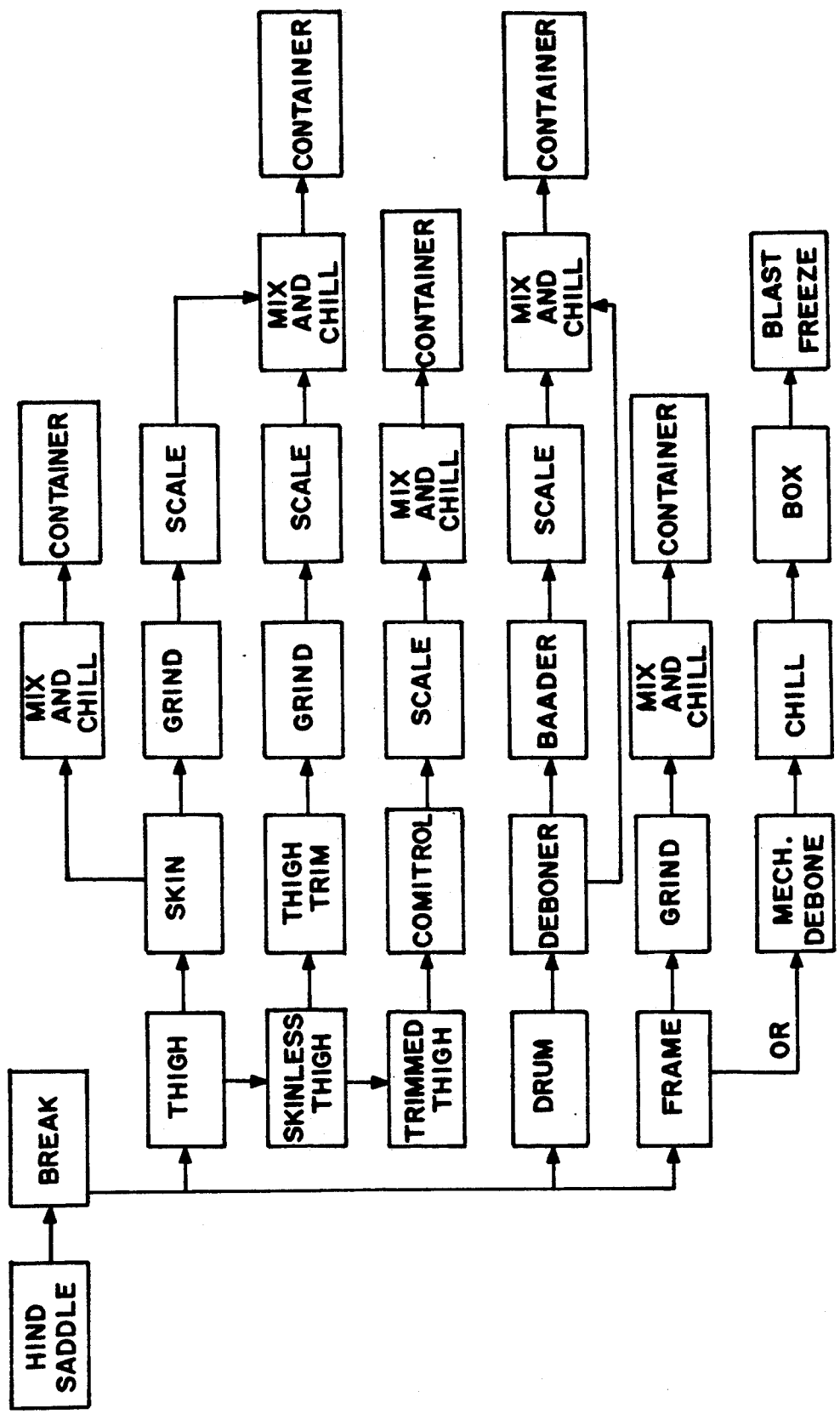
FIG. 3 is a block flow diagram for the dark meat cured preblends after removal of the breast portion for the hind saddle portion.

FIG. 3 is a block flow diagram of the handling and blending steps for the dark meat cured preblends. In preparing a skinless thigh preblend for turkey ham, for example, the thigh portions, FIG. 3, may be skinned and the skinless thighs trimmed. The trimmed thighs are reduced in size, weighed, and directed to a mixer where ice, salt, a cure mixture and carbon dioxide may be added. The thigh trim and skin may be used in making smoked sausage. The thigh trim is ground and directed to a mixer where salt, a cure mixture, ice and/or carbon dioxide are added. The ground skin is then added to the mixture while continuing to add carbon dioxide. The final mix is placed in containers and held at refrigerated temperatures. The drum meat may also be used in making smoked sausage by mixing with ice, salt, a cure mixture and carbon dioxide. The dark meat cured preblends are chilled to 40 degrees Fahrenheit or below within three hours of slaughter.

What is claimed as being new and what is desired to be protected by letters patent of the United States is as follows:

1. A method of processing turkey carcasses comprising; moving a plurality of previously eviscerated birds along a processing path, as each bird moves along the processing path, splitting the bird into white meat breast portion and a dark meat hind saddle portion, immediately removing dark meat warm muscle parts from the hind saddle portion prior to rigor mortis, processing the dark meat parts, and preserving the processed dark meat.

2. A method as claimed in claim 1, and further including the step of separating the saddle portion into drum, thigh and frame portions prior to removing the dark meat therefrom.

3. A method as claimed in claim 1, wherein the processed dark meat is chilled to a temperature below 40 degrees Fahrenheit.

4. A method as claimed in claim 3, wherein the processed dark meat is chilled within two hours of killing of a bird.

5. A method for the conversion of live turkeys to meat products comprising the steps of slaughtering, defeathering and eviscerating the birds as they move along a predetermined path, immediately following evisceration, dividing each bird carcass into a white meat breast portion and a dark meat saddle portion, immediately after dividing the carcass, transporting to a deboning room, hot deboning the dark meat saddle portion prior to rigor mortis, and chilling the deboned raw materials to a temperature below 40 degrees Fahrenheit.

6. The method as claimed in claim 5, wherein the dark meat saddle portion comprises the back frame, thighs and at least one drum.

7. The method as claimed in claim 6, and further including the step of separating the dark meat saddle portion into drum, thigh and back frame portions prior to hot deboning.

8. A poultry processing method including the conversion of a live bird to an eviscerated carcass and converting the carcass dark meat to deboned raw material prior to rigor mortis comprising the steps of; providing a slaughtered, defeathered, eviscerated warm poultry carcass, halving the warm carcass into a white meat breast portion and a hind saddle dark meat portion, separating the hind saddle portion into drum, thigh and back frame pieces, deboning the warm drum, thigh and back frame pieces, processing the hot boned dark meat, and chilling the processed meat.

9. The method as claimed in claim 8, wherein the hind saddle portion is deboned within an area refrigerated to approximately 50 degrees Fahrenheit.

* * * * *